United States Patent [19]

Adcock

[11] 4,163,256
[45] * Jul. 31, 1979

[54] ELECTRONIC PHOTOGRAPHY SYSTEM

[75] Inventor: Willis A. Adcock, Dallas, Tex.

[73] Assignee: Texas Instruments Incorporated, Dallas, Tex.

[*] Notice: The portion of the term of this patent subsequent to Nov. 8, 1994, has been disclaimed.

[21] Appl. No.: 809,258

[22] Filed: Jun. 23, 1977

Related U.S. Application Data

[63] Continuation of Ser. No. 736,975, Oct. 29, 1976, Pat. No. 4,057,830, which is a continuation of Ser. No. 543,106, Jan. 22, 1975, abandoned, which is a continuation of Ser. No. 460,396, Apr. 12, 1974, abandoned, which is a continuation of Ser. No. 266,826, Jun. 27, 1972, abandoned.

[51] Int. Cl.² .................. H04N 5/78; H04N 7/18
[52] U.S. Cl. ............................ 358/127; 358/134; 360/35
[58] Field of Search ............. 360/33, 35, 10, 9; 358/127, 133, 134, 137, 83, 4, 93; 179/2 TV; 354/48

[56] References Cited

U.S. PATENT DOCUMENTS

| | | | |
|---|---|---|---|
| 1,116,949 | 11/1914 | Stille | 360/33 |
| 2,955,157 | 10/1960 | Young | 360/10 |
| 3,051,777 | 8/1962 | Lemelson | 360/35 |
| 3,251,937 | 5/1966 | Hoag | 358/256 |
| 3,482,040 | 12/1969 | Brinster | 358/85 |
| 3,501,584 | 3/1970 | Machein | 360/10 |
| 3,527,880 | 9/1970 | Gordon | 360/33 |
| 3,609,227 | 9/1971 | Kuijian | 360/35 |
| 3,614,309 | 10/1971 | Presti | 360/35 |
| 3,683,111 | 8/1972 | Southworth | 360/9 |
| 3,792,194 | 2/1974 | Wood | 358/134 |
| 3,833,758 | 9/1974 | Ferrari | 358/127 |
| 3,962,725 | 6/1976 | Lemke | 360/33 |
| 4,008,489 | 2/1977 | Gilsdorf | 360/33 |
| 4,057,830 | 11/1977 | Adcock | 358/127 |

Primary Examiner—Bernard Konick
Assistant Examiner—Alan Faber
Attorney, Agent, or Firm—Stephen S. Sadacca; James T. Comfort; Melvin Sharp

[57] ABSTRACT

A completely electronic system for recording and subsequently displaying still life pictures includes an optical-electronic transducer for generating electronic signals responsive to an optical image. The signals are stored and subsequently applied to a visual display. Means are provided for applying the signals at a scan rate synchronized with the scan rate of the display to effect a stationary display of the optical image. Preferably, the display is a conventional television set.

2 Claims, 21 Drawing Figures

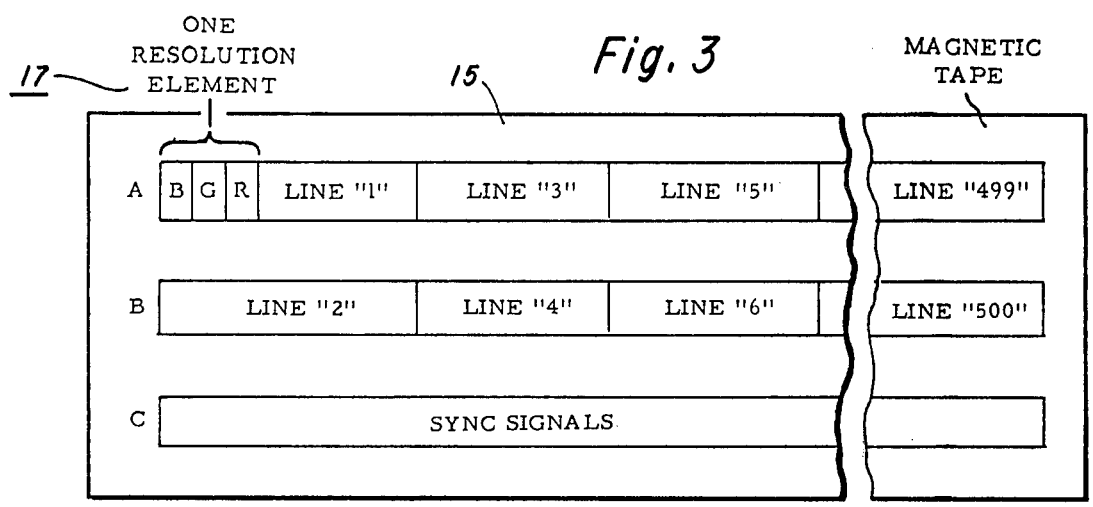
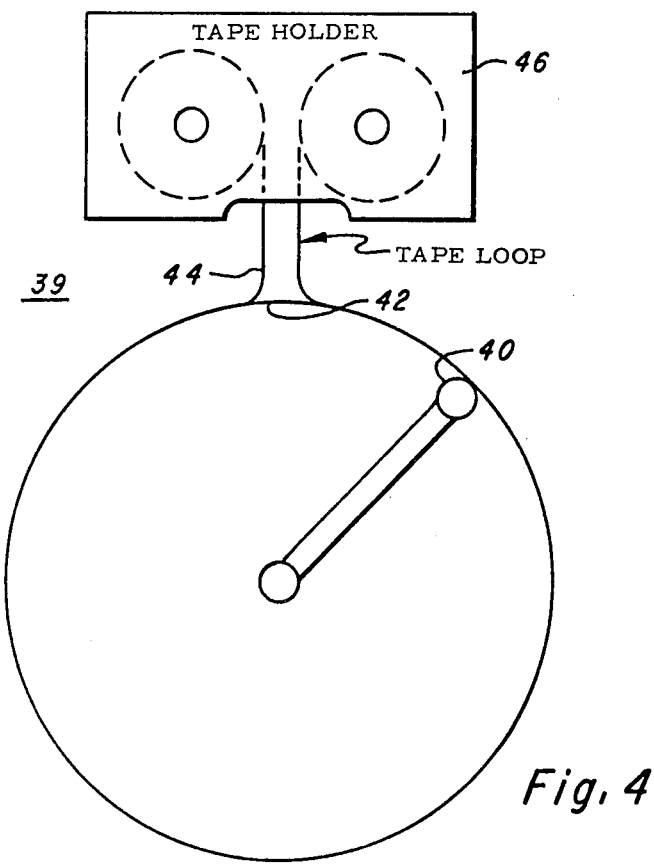

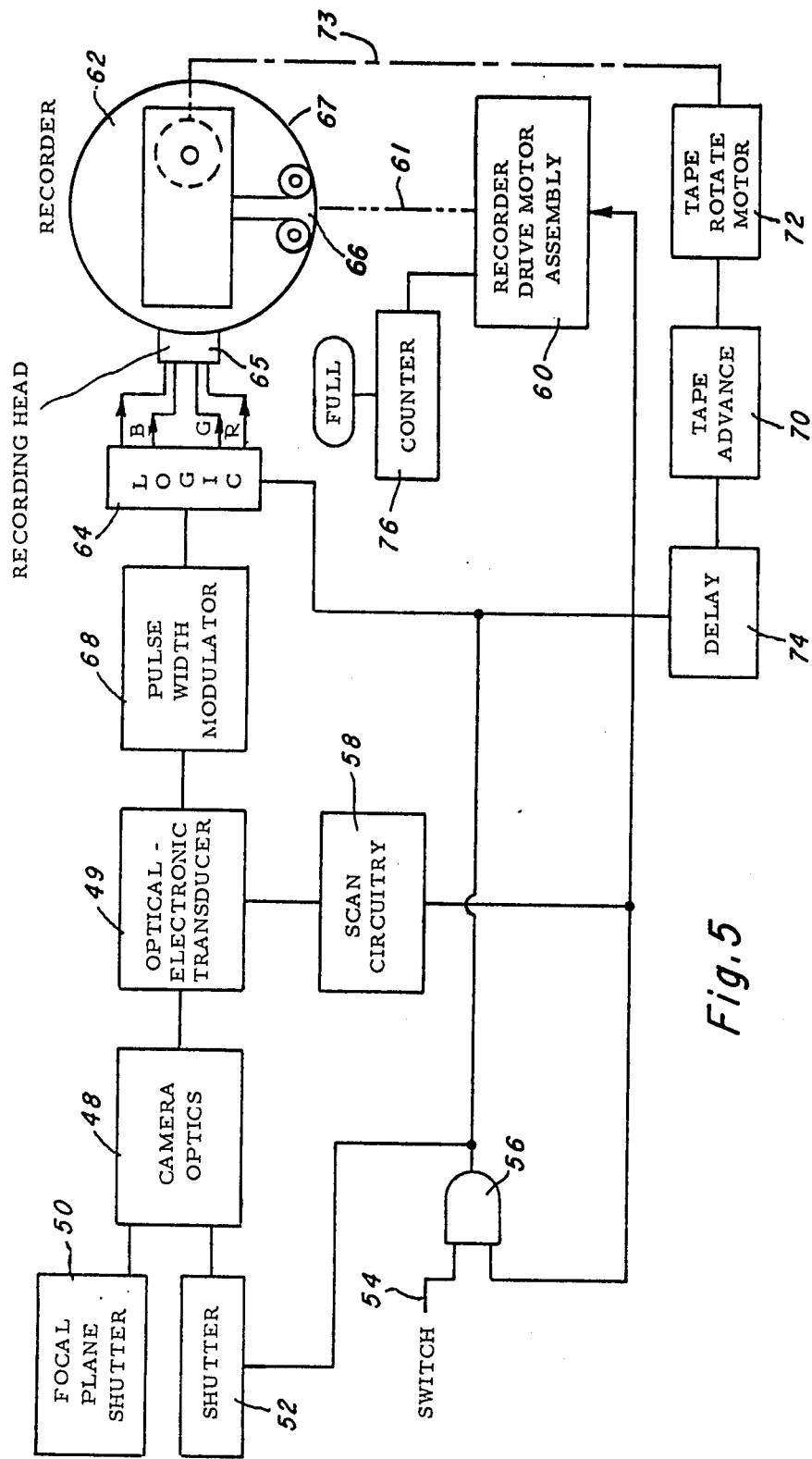

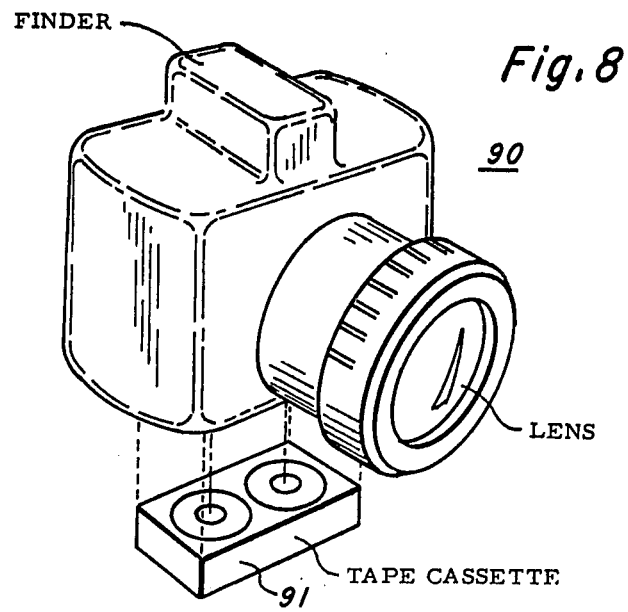
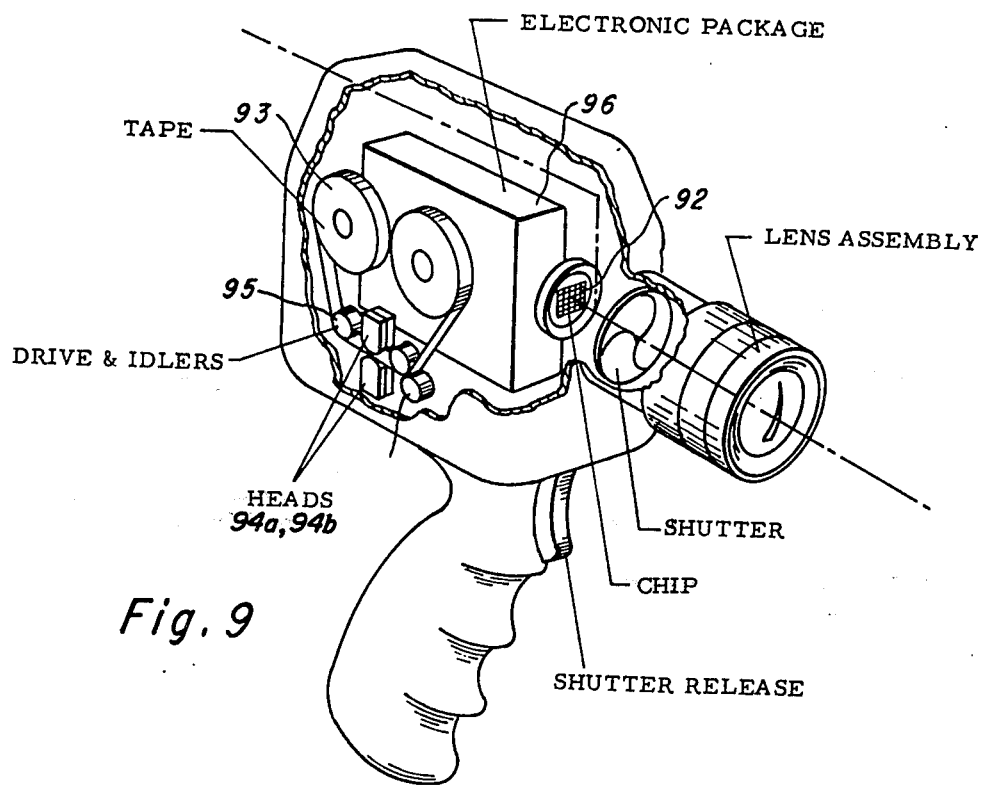

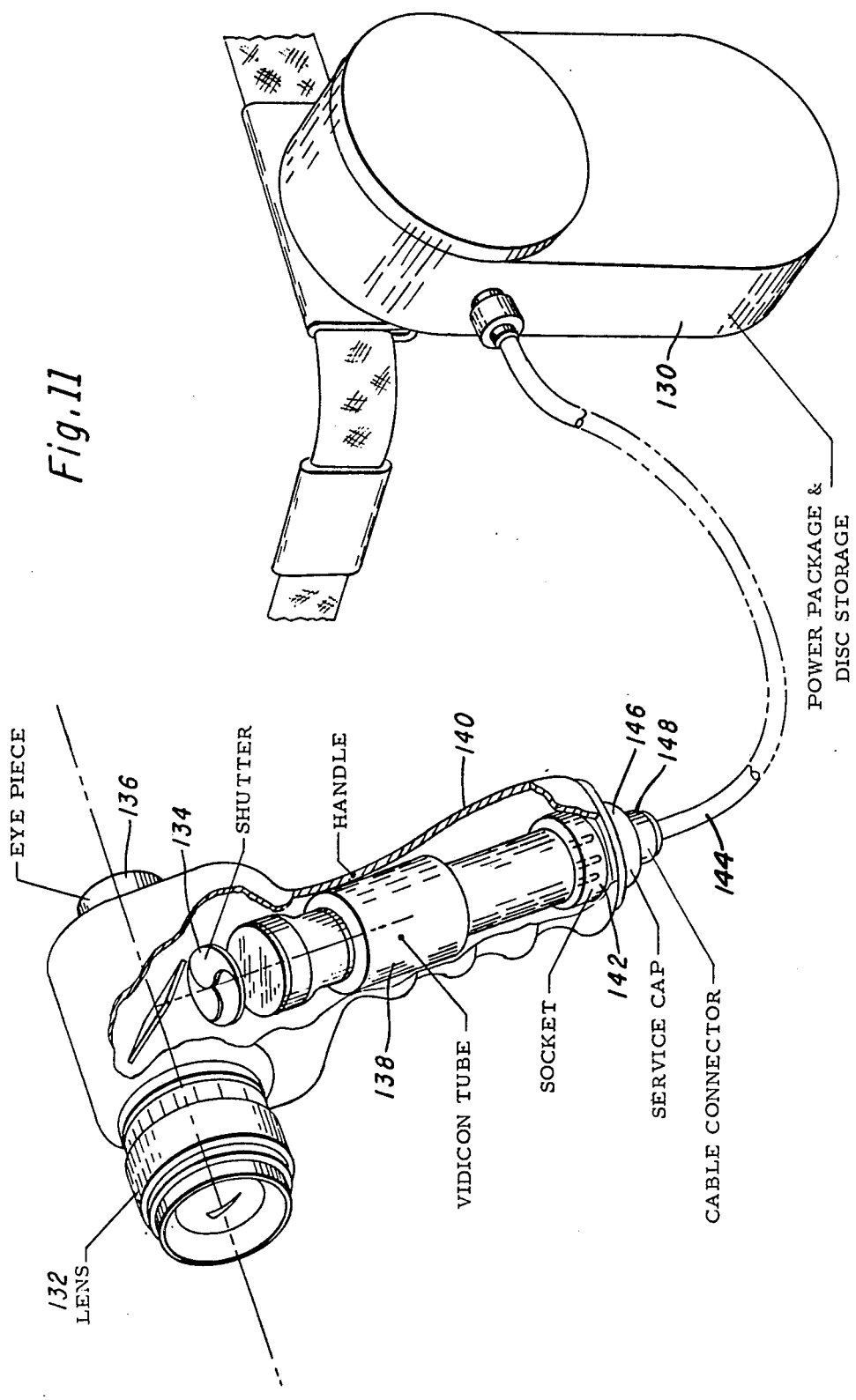

RF CONVERTER 171

TV SET

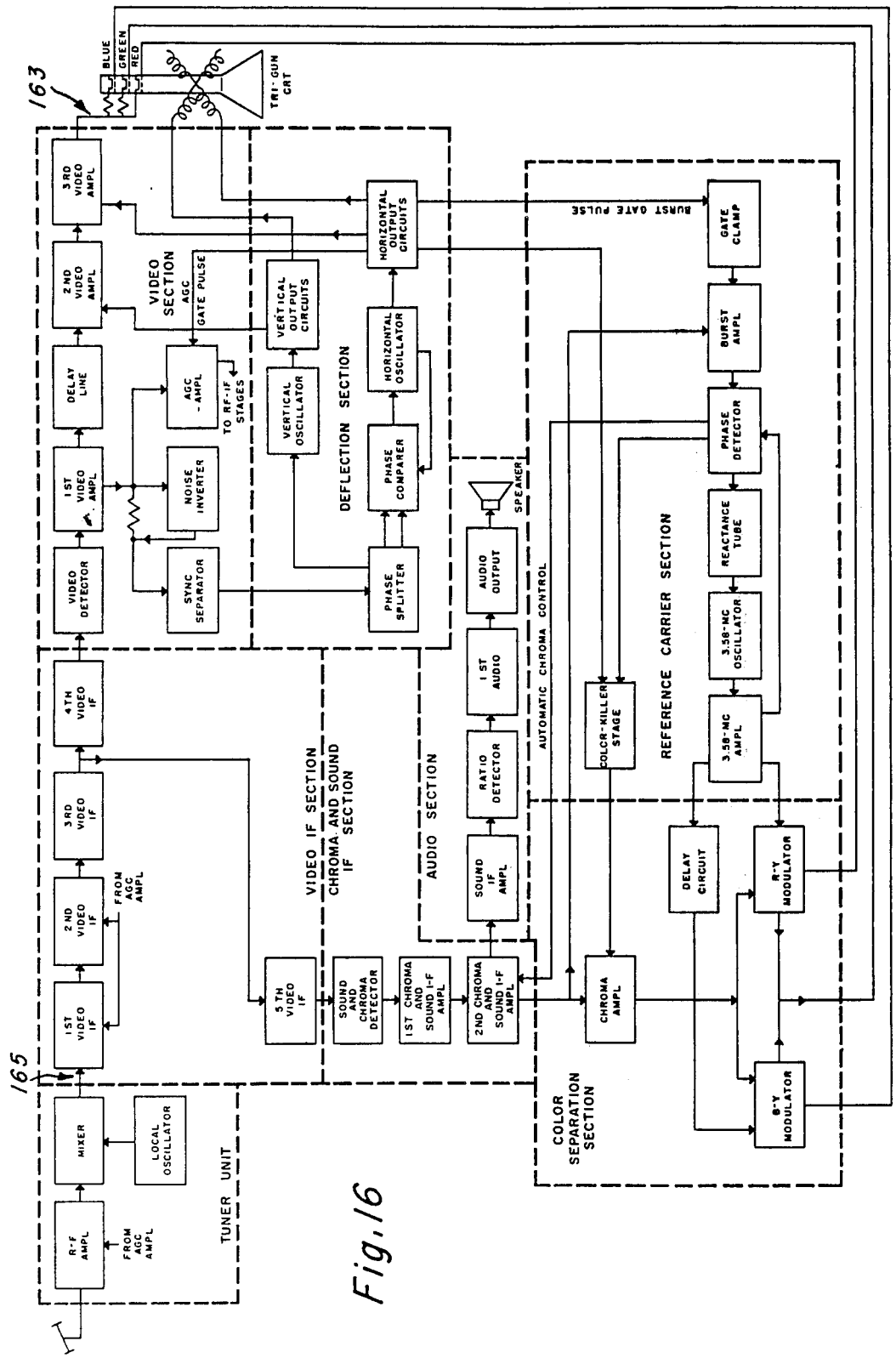

ELECTRONIC PHOTOGRAPHY SYSTEM

This is a continuation of application Ser. No. 736,975, filed Oct. 29, 1976, now U.S. Pat. No. 4,057,830, which is continuation of Ser. No. 543,106, filed Jan. 22, 1975 now abandoned, which is a continuation of Ser. No. 460,396, filed Apr. 12, 1974, now abandoned, which is a continuation of Ser. No. 266,826, filed June 27, 1972, now abandoned.

The present invention pertains to electronic recording and display systems in general, and more particularly to a completely electronic system for electronically recording and subsequently displaying still-life pictures. More specifically the invention includes provision for storing electronic signals from an optical-electronic transducer and subsequently detecting these recorded signals at a rate synchronized with television frame rates to enable display of stationary pictures on conventional television receivers.

Modern day photography includes cameras which utilize film requiring chemical processing. Such film is not entirely satisfactory in that the chemical processing requires special equipment and is thus relatively expensive. Further, the range of colors obtainable on commercial film is limited. In addition if slides are desired, an additional display or projector is required. At present, for still picture photographers, there are no suitable alternatives to the chemically processed film recording media.

Accordingly, an object of the invention is the provision of an improved, less expensive photography system.

An additional object of the invention is a completely electronic photography system.

A further object of the invention is the provision of a photography sytem effective to store on a magnetic media the record corresponding to an image.

Yet another object of the invention is the provision of an electronic photography system which utilizes a conventional television set for display of the magnetically recorded image.

In accordance with the invention a completely electronic recording and display photography system is provided. As used herein, the term electronic photographic system pertains to an electronic system which produces the equivalent of a still picture recording and display system defined by a standard camera, photosensitive film, and slide projector arrangement, without the requirement of using photosensitive film with the attendant chemical processing, and separate slide projector. The system includes an optical-electronic transducer for producing electronic signals responsive to an exposed image. Conventional lens, viewfinder, shutter speed control etc. associated with present day film-type cameras can be utilized to focus the image on the transducer for the requisite time. The image impressed upon the transducer is stored in a matrix of storage elements respectively defining resolution elements and subsequently each resolution element is recorded on a permanent storage media such as magnetic tape. The image can be displayed by detecting the recorded signals at a frequency rate synchronized with the frame rate of a visual display such as a conventional television set. The portion of the storage media containing the record of the respective resolution elements associated with the desired picture or image is repetitively scanned at a rate synchronized with the television frame rate to produce on the television screen a still picture of the recorded image.

The electronic system is advantageous in that expensive film processing is completely eliminated. Further, the pictures are recorded on inexpensive magnetic tape, as many as 300 pictures being recorded on a tape contained in a small cassette. This results in a cost per picture orders of magnitude less than achievable with conventional photosensitive film. Additionally, most families already own television sets, providing a convenient visual display media. The color available on commercial television sets has a broader range capability than photosensitive film and can also be "edited" as desired using the color controls of the television set. Technology for producing an electronic camera having suitable optical-electronic transducer targets for recording the desired image is available, as will be described in more detail hereinafter.

Other objects and advantages of the invention will be apparent upon reading the following detailed description of illustrative embodiments of the invention in conjunction with the drawings wherein:

FIG. 3 is a diagrammatical illustration of a suitable magnetic tape format for recording electronic signals defining a color image.

FIG. 4 diagrammatically depicts an electromechanical frequency converter apparatus suitable for use in the system of the present invention.

FIG. 5 is a functional block diagram of an electronic signal recording system suitable for use with the present electronic photography system.

Figure 6:
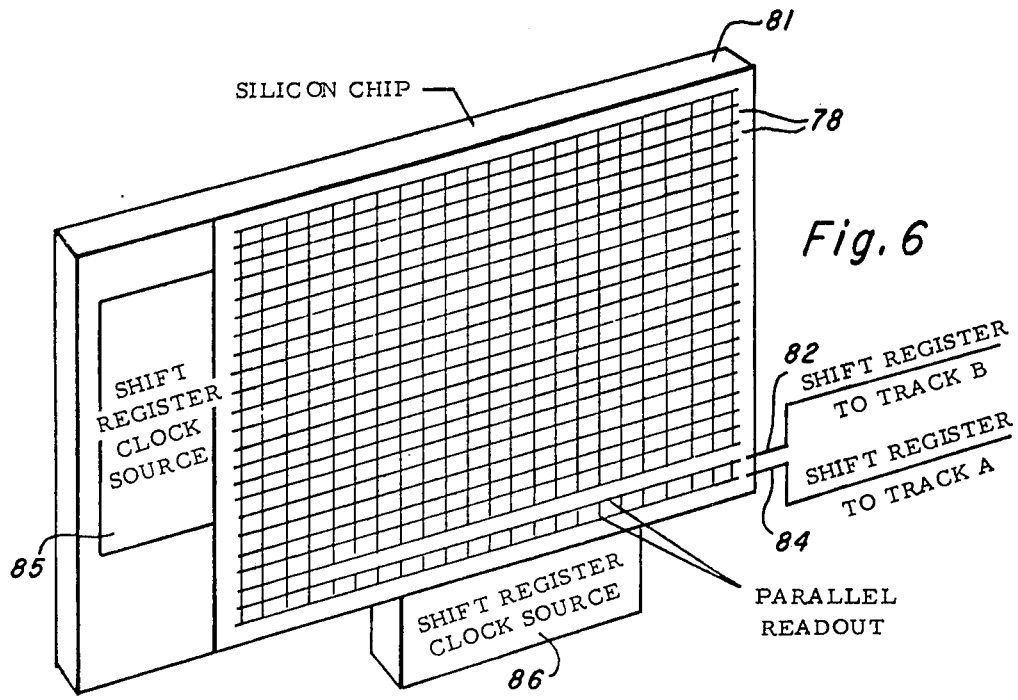
Figure 7:
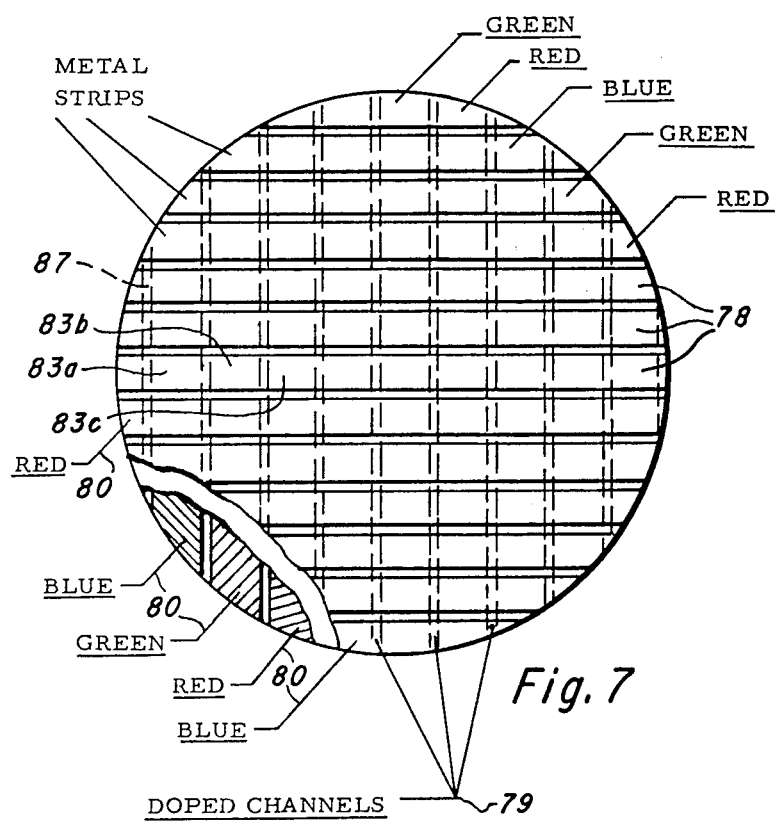

FIGS. 6 and 7 diagrammatically illustrate a charge-transfer optical-electronic transducer.

FIGS. 8 and 9 pictorially illustrate suitable electronic camera configurations for an embodiment of the invention utilizing magnetic tape as the electronic signal storage media.

Figure 10:
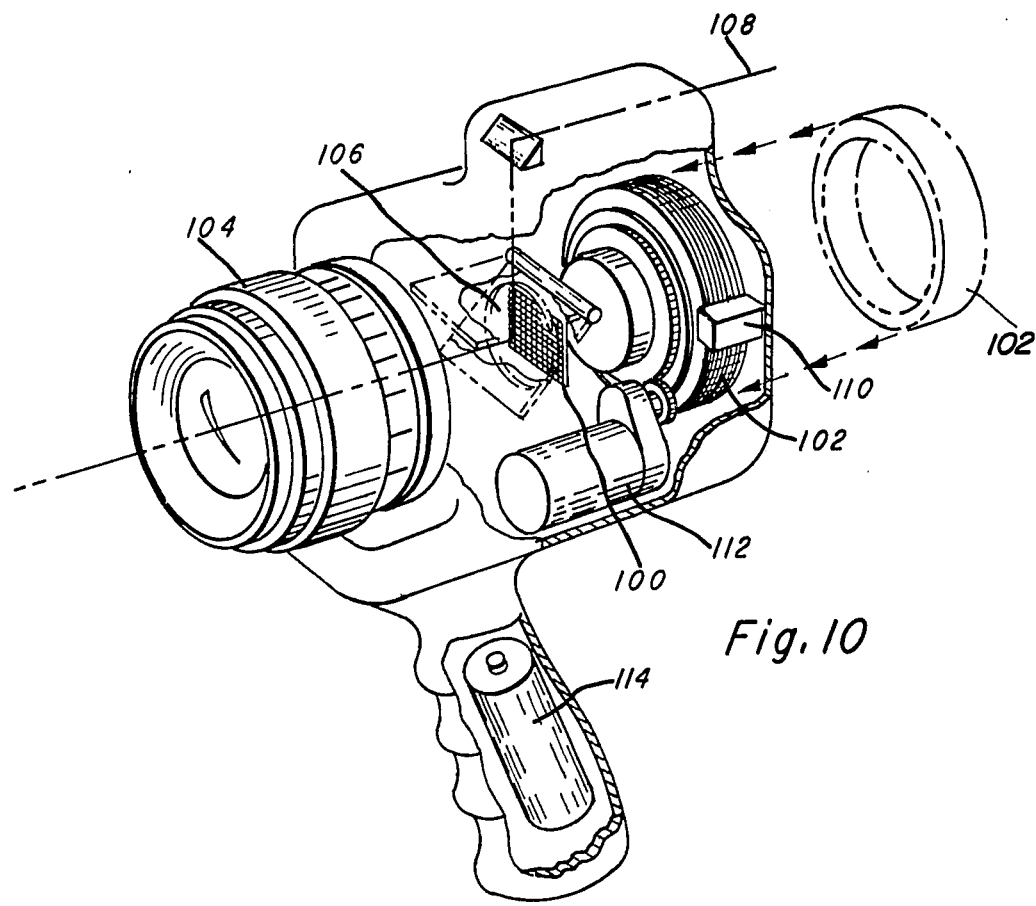

FIG. 10 pictorially illustrates an embodiment of the invention utilizing a magnetic drum as the recording media and a convenient camera configuration.

FIG. 11 pictorially depicts an embodiment of the invention wherein the electronic camera includes a vidicon as the electro-optical transducer, and a magnetic disc as the storage media.

Figure 12:
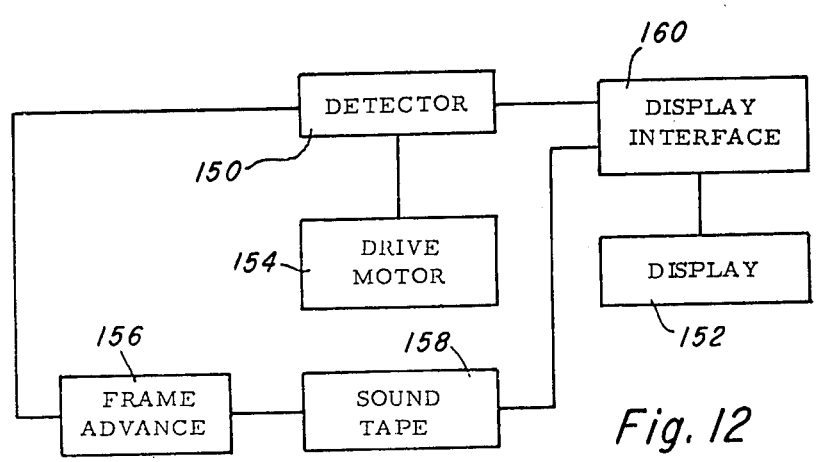

FIG. 12 is a block diagram illustration of a suitable still picture playback portion of the present electronic photography system.

FIGS. 13–15b are pictorial illustrations depicting a suitable implementation configuration of the play-back portion illustrated in FIG. 12.

Figure 13:
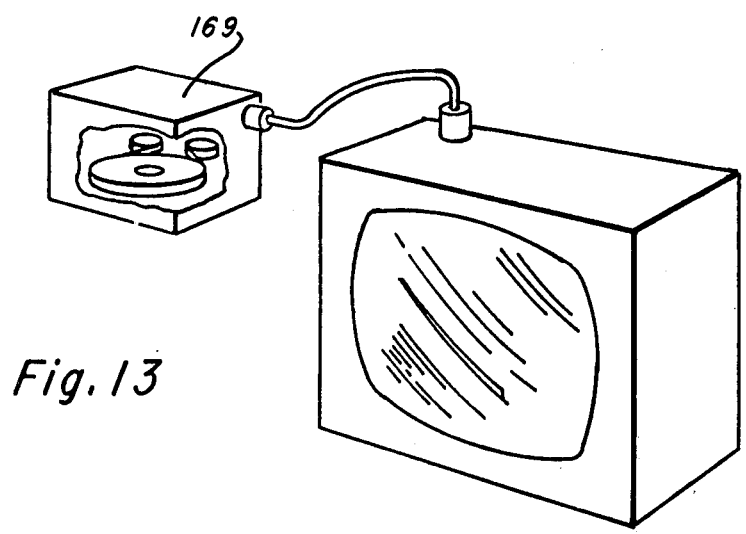

FIG. 16 schematically and in block diagram illustrates a typical color television set which may be used as the visual display in accordance with the invention, identifying suitable electrical contact points for the embodiment of FIG. 13; and FIGS. 17–20 illustrate suitable magnetic tape recording and playback configurations.

DETAILED DESCRIPTION

One of the advantages of the present electronic photography system involves its compatability with the utilization of commercial television receivers for displaying still pictures. With this in mind it is recognized that the interface or buffer between the media utilized to store the electronic record of the pictures and the display must be such to ensure compatibility with television display format. Understanding of the present invention will be facilitated by first generally considering current television format requirements. The American TV system is described below. Other television formats could be utilized, if desired, by providing the required interface.

The American TV system standards provide for a frame frequency of essentially 30 cycles per second (CPS) composed of two interlaced fields respectively having a field frequency of essentially 60 CPS. A line scanning frequency of 15,750 CPS defines 525 lines in the raster. Accordingly, with respect to the present invention, the electronic signals defining the record of a picture stored on the recording media are repetitively applied to the television set 30 times each second.

The visual display system and the required interface will be described in more detail hereinafter in the visual display section hereof. Various suitable interface configurations will be described.

Electronic Photography System

Figure 1:
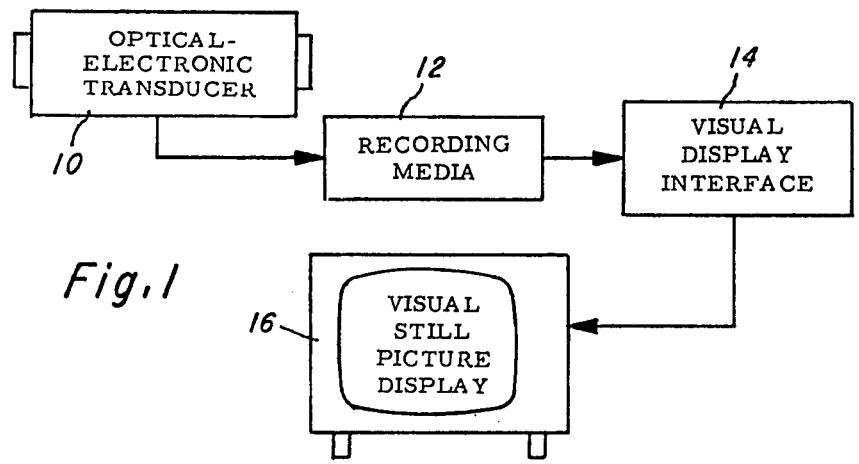
FIGS. 1 and 2 are functional block diagram illustrations of an electronic photography system in accordance with the present invention.

With reference to FIG. 1 there is illustrated in functional block diagram format the electronic photography system of the present invention. The system includes an optical-electrical transducer 10 for producing electronic signals corresponding to and defining an optical image to which it is exposed. The transducer is coupled to a recording media 12 effective to store the electronic signals produced by the transducer 10. Preferably the recording media comprises inexpensive storage media such as magnetic tape, discs, and drums. Following exposure of the transducer 10, the recording media is electrically coupled to the transducer. Suitable arrangements are illustrated, for example, in FIGS. 8 and 9.

To enable display of the stored record the recording media 12 is electrically coupled to a visual display interface block 14. As will be described in detail hereinafter with reference to the detailed description of FIGS. 12-15, the interface 14 is operable to ensure that the signals recorded by the recording media 12 are applied to the visual display 16 at a rate compatible with the display format.

Figure 2:
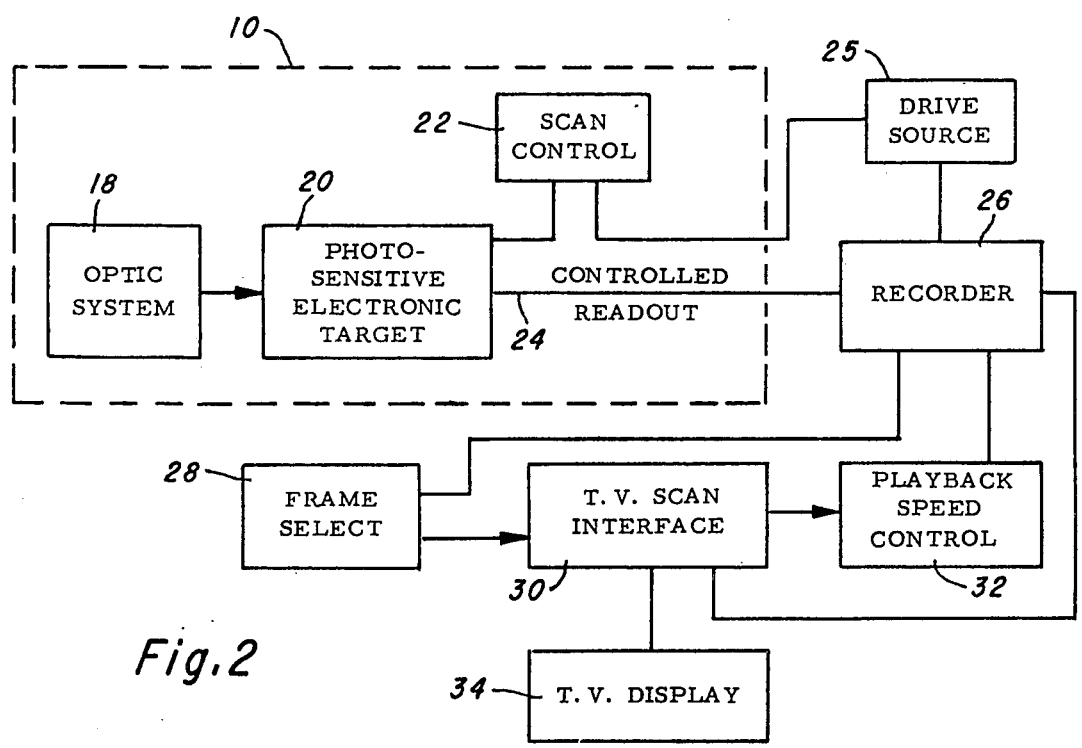

With reference to FIG. 2, a more detailed functional block diagram of the system illustrated generally in FIG. 1 is provided. In FIG. 2 the transducer 10 includes elements 18, 20, and 22. An optic system is shown generally at 18. This system may, for example, comprise optic systems used for conventional film-type cameras. The optics 18 are operative to control the correct exposure for a given lighting situation, and focus the image on the photo-sensitive target 20. In accordance with the invention the target 20 is a matrix or array of separately addressable photosensitive storage elements. A convenient transducer size e.g., is on the order of $\frac{1}{2}'' \times \frac{3}{8}''$. The target 20 is photosensitive; i.e., the electrical characteristics of each storage element varies proportional to impinging light. Thus the target stores analog data. The optics 18 focus a desired image on the target 20 for a duraction determined by the shutter speed control, which in turn is responsive to the lighting conditions etc.

As will be explained more fully with respect to discussion of FIGS. 6 and 7, suitable targets include the vidicon, and charge transfer device matrices. These targets have provision for sequential read-out of the stored signal. That is, the target 20 itself is operable to retain the stored signal for a substantial length of time, enabling read-out at a desired rate. On the other hand, the targets are responsive to signals of very short duration, enabling use of high-speed shutters for "stop-action" photography.

A scan control circuit 22 provides control signals for controlling the rate of read-out of the analog data stored in the target 20. When a vidicon type target is used, the scan control regulates the scan rate of the various storage elements, the signal being the amount of current required to recharge the storage element to a reference potential. When a matrix of, e.g., charge coupled devices define the target 20, the scan control 22 is effective to regulate the clock rate of the shift register read-out of data. A drive source 25 is coupled to the recorder 26 to provide the desired recording speed. The drive source is also coupled to the scan control 22 to ensure synchronization. When the drive source comprises a synchronous motor, the scan control signal is preferably generated responsive to the motor shaft speed.

The analog data stored by the target 20 is sequentially read-out at 24 in the form of electrical signals. These signals are recorded at 26. The scan control 22 is coupled to the recorder 26 via the drive source 25 to synchronize the read-out and signal record.

In the manner above described, a record of a desired image, i.e., "picture" is recorded, e.g., on a magnetic tape. In practice the recorder 26 is connected to the transducer 10 following exposure of the target. For display of the pictures the media on which the signals are recorded are removed, i.e., disconnected, from the camera for playback on a suitable visual display such as a television receiver. As explained previously, interface provisions are required to ensure that the electronic record is applied to the display in a compatible format. Suitable interface circuitry 14 is shown in more detail in FIG. 2 as including a frame select 28, scan interface 30, playback speed control 32, and display 34. The frame select 28 is effective to index the desired record of the recorder 26, it being recalled that, e.g., as many as 300 or more separate pictures or frames may be stored on the record. The scan interface provides synchronizing signals to ensure that the selected record is repetitively scanned 30 times a second for a TV display. The scan interface provides control signals to the playback speed control unit 32 which in turn controls the speed or frequency or playback.

The television display 34 receives signals during each frame time corresponding to the record selected by the frame select 28. Since this record is repetitively scanned during each frame time, a stationary picture is displayed on the television screen. Suitable connection to a television set is schematically depicted with reference to FIGS. 13-14.

Recording System

As was explained previously, the American TV standards provide for a frame rate of in essence 30 frames per second consisting of two interlaced fields respectively having a rate of 60 frames per second. Thus, each complete frame (picture) recorded must include two fields which, upon playback, have an effective duration of 1/60th second each. A preferred tape formate suitable for use with a charge-coupled device photo-electrical transducer for recording a color picture as illustrated in FIG. 3.

In this embodiment, and as will subsequently be described with reference to the charge coupled device (CCD) target illustrated in FIGS. 6 and 7, the respective resolution elements defining a line of the television raster are sequentially read-out in shift register fashion. By way of illustration, in a 500 line raster, one of the interlaced fields is defined by odd-numbered lines, i.e., 1, 3, 5, 7 ... 499, and the other interlaced field is defined by even-numbered lines 2, 4, 6, 8 ... 500. In the illustrated embodiment, a dual head recorder is used and two lines of the raster are read simultaneously. For example, initially, lines 1 and 2 of the raster are detected and recorded on separate tracks A and B of the magnetic tape 15. A resolution element is shown generally at 17 and includes separate signals respectively corresponding to the Blue, Green, and Red components of the image to which it was exposed. These signals may, for example, be provided by placing color filters over portions of the target, as illustrated in FIG. 7. Typically, on the order of around 2–3 hundred resolution elements per line may be used.

Thus, Track A of the tape 15 sequentially records the Blue, Green, and Red components of the odd-numbered lines, while Track B records similar data for the even numbered lines of the raster. This portion of the magnetic tape then defines one frame or color picture. As will be explained with reference to FIGS. 13–15, when such a portion is scanned at a rate of 30 times per second and applied to a television set, a still picture is displayed. Track C of the tape may be utilized to provide synchronization signals.

A suitable technique for recording the electronic signals corresponding to the exposed image at a low frequency and playing back the recorded data at a higher television compatible rate is illustrated in FIG. 4. With reference to FIG. 4, an electro-mechanical frequency converter system utilizing magnetic tape is illustrated. The system includes a variable speed recorder/-player illustrated generally at 39. In this embodiment a magnetic head 40 rotates along the interior of a drum 42 around which a tape 44 is wound. A suitable tape holder is illustrated at 46. Means (not shown), such as a synchronous motor, are provided for controlling the speed of rotation of the head 40. The signal produced by the previously described transducer is recorded on the tape 44. In this embodiment, it is desirable for all of the information relative to the picture to be recorded during one revolution of the head 40. A convenient speed has been found to be on the order of 60–100 RPM. For such a speed the transducer must retain the stored signal for about one second. That is, typically, the target will be exposed for only a fraction of a second. In the illustrated preferred CCD target embodiment lines 499 and 500 (FIGURE 3) will not be recorded by the head 40 until after about one second following exposure. As illustrated, one frame, i.e., one picture is stored on that amount of tape around the periphery of the drum 42.

For playback on a television set, it is to be recalled that a 30 frame/second rate is required. In the present embodiment where one picture (i.e., frame) is recorded during one revolution of the head 40 at 60 RPMs, it may be seen that by increasing the speed of the tape head from 60 RPMs to e.g., 1800 RPM (for a tape format where the two fields per frame are sequentially located on the same track) the required frame rate of 30 frames per second is achieved.

With reference to FIG. 5 a functional block diagram of an illustrative recording portion of the electronic photographic system of the present invention is illustrated. Here, a recording camera includes camera optics 48, having a focal plane shutter 50 and shutter 52, and an optical-electronic transducer 49.

As illustrated, the shutter 52 is responsive to a switch 54 which is activated to initiate the picture exposure. The switch 54 is connected to logic control such as AND gate 56 which is connected to scan circuitry 58 of the target and also to the recorder-drive motor assembly 60. A cassette recorder 62 is shown for illustration. The particular recording arrangement here illustrated, which includes a rotating drum 67 around which the magnetic tape extends, is described in detail with reference to FIG. 19 below.

The output of the AND gate 56 is connected to the shutter 52 for activation thereof and also to logic circuitry 64 which is effective to apply the respective color and sync signals to the recording head 65. Operation of camera optics is well understood to those in the art and a detailed description thereof need not be included herein.

For a vidicon target the signals stored in the various elements of the photosensitive array are detected by scanning the array and measuring the recharge current. Scan circuitry 58 controls read-out of the transducer 49. As may be seen, the scanning circuitry is coupled to the motor assembly 60. The output of the AND gate 56 is coupled to the logic circuitry 64 thereby enabling it to apply signals to the recording head 65. Thus there is provision for ensuring that the tape-gap 66 of the cassette 62 is synchronized with the read-out of data from the transducer 49, i.e., corresponds to the vertical retrace period of the scan circuitry 58 so that data will not be lost.

Signals corresponding to the image focused on the transducer 49 and stored by the photosensitive array elements thereof is detected by scanning the target and measuring the recharge current. Separate color records are produced for each of the primary colors (for a color picture example), and can be processed by a pulse width modulator 68 to improve signal-to-noise ratio. Such processing is described in more detail in Reynolds,"A Helical-Scan Color Videotape Recorder for the Broadcaster," Oct. 1970, Journal of the SMPTE, Vol. 79.

The signals are then applied to the logic circuitry 64 and are subsequently recorded on the tape in the cassette 62 by the recording head 65. The scan circuitry 58 and the motor assembly 60 are coupled so that during one revolution of the tape head (exclusive of the gap 66) the scan circuitry 58 is effective to completely scan the transducer 49. Thus one frame of information, i.e., one picture, is recorded on the magnetic tape. For a tape head speed of 60 RPMs, another picture could not be taken for one second. The AND gate 56 is effective to preclude operation of the shutter until the previous signal is recorded on the tape. After the picture is recorded, advance tape circuitry 70 in conjunction with tape rotate motor 72 advances a new portion of tape from the cassette by the coupling 73. When a picture is taken, a signal from the AND gate 56 is applied to delay circuitry 74. The signal is delayed a sufficient time to enable recordation of the picture on the tape, and then the signal enables the advance tape circuitry 70 and tape rotate motor 72 for positioning a new portion of tape for the next picture. A control 76 provides a signal when all of the available tape has been utilized.

Various configurations of cameras may be utilized, such as the one previously referenced. For color pictures a camera having three tubes, one for each primary color, may be used. Alternatively, a single tube camera in conjunction with a color wheel may be advantageous. For this configuration three separate records could be produced by rotating the color wheel. Also, color filters could be placed adjacent the storage elements for selectively producing records of the three colors.

An alternative photosensitive target to the aforementioned vidicon, and the preferred target in accordance with the invention, is illustrated in FIGS. 6 and 7 and includes charge transfer device shift registers. As understood by those skilled in the art, charge-transfer devices include insulated-gate field-effect transistor bucket-brigades and charge-coupled devices. The charge transfer devices are photosensitive and store analog signals. They are inexpensive, operate at low voltage levels, and are easily manufactured in integrated circuit format. The charge transfer speed may be varied merely by changing the clock voltage frequency. A portion of a CCD target array is digramatically illustrated in FIGS. 6 and 7. A series of horizontal rows 78 respectively define charge transfer device shift registers.

As understood by those skilled in the art, typically, a set of three metal electrode lines 78 are utilized to define one bit of a CCD shift register, the data being stored in an underlying semiconductor substrate under the middle electrode. Vertical diffused or doped channels 79 in the semiconductor material itself patterns the target. These diffused regions prevent lateral diffusion of the signal or charge generated responsive to the target being exposed to an image. As shown most clearly in FIG. 7, color filters 80 are positioned over the face of the target upon which the image is impressed. As may be seen these color filters 80 are adjacent columnar regions of the semiconductor substrate 81 defined by each pair of diffused channels 79.

A typical resolution element of the target is shown at 87 and includes a set of three spaced metal electrodes 78 and three columnar regions 83a, 83b, 83c, respectively for receiving and storing information corresponding to the Blue, Green and Red components of an exposed image. Typically, the target may comprise 500 shift register bits defining a 500 line raster, and on the order of 300-350 horizontal resolution elements, providing resolution compatible with television capabilities.

In operation, the optical system of the camera focuses the desired image on the storage matrix and each resolution element stores an analog signal corresponding to the red, blue or green components of that portion of the image. The shutter then closes and the array stores the signals pending read-out (which may take on the order of one second or so). As illustrated, the vertical clock source 85 effects a shift of the data downwards, preferably in shifts of two bits or rows of data at a time into data read-out shift registers 82 and 84. The vertical clock 85 is then discontinued and horizontal registers 82 and 84 are read-out simultaneously to be recorded on a multiple track tape as field one and field two of the two interlaced fields required for each television frame (Reference FIG. 3). The process is repeated until the complete array is read-out. The horizontal shift registers 82 and 84 are controlled by the clock 86.

Operation and fabrication of charge-transfer device shift registers is well known to those skilled in the art and need not be explained in detail herein. Additional details may be obtained by reference to Kovac et al, "Solid State Imaging Emerges from Charge Transport," Electronics, p. 72, Feb. 28, 1972.

Various configuration of suitable optical-electrical transducers in conjunction with magnetic recorders in accordance with the invention have been described. With reference to FIGS. 8—11 illustrative examples of suitable arrangements for recording a number of pictures on the recorder are illustrated. These configurations are illustrative only and are not intended as limitations to the invention.

With reference to FIG. 8, an electronic camera is illustrated at 90. A tape cassette 91 is mounted (by means not shown) for recording an electronic signal focused on a photo-sensitive photo-electronic transducer by the optics of the camera. A suitable arrangement is illustrated with reference to FIG. 8.

In FIG. 9 a semiconductor target 92, may, e.g., comprise a CCD array as previously described. Magnetic tape 93 is mounted in a suitable holder and extends over drive and idler pulleys 95 past recording heads 94A and 94B. The tape is advanced over the heads 94A and B at a rate and for a duration determined by the electronic package 96. This package includes circuitry for controlling read-out of the data on the target 92 and synchronization with tape position. Suitable control circuitry was described generally with reference to FIG. 5. Circuitry for implementing the control, and functions depicted in FIG. 5 are known in the art and need not be explained in detail herein.

With reference to FIG. 10, an electronic camera includes a semiconductor matrix target diagrammatically depicted at 100. This target, for example, may be similar to that described with reference to FIG. 6. In this embodiment of the invention a magnetic drum 102 is used to record the electrical signals produced when target 100 is exposed to an image. The image is focused on the target 100 by the lens system 104 and the shutter 106. A view finder 108 enables the "photographer" to see what image is being recorded. A magnetic recording head is shown at 110 and receives the data from the target 100 (by circuitry not shown) and records the data on the revolving drum 102. A motor 112 is connected to the drum 102 to provide drum rotation at the desired speed. A battery 114 can be conveniently located in the handle of the camera to drive the motor 112 and effect operation of the target 100 and read-out thereof. As illustrated, where the drum storage capacity is reached, or whenever it is desired to view recorded pictures, the drum can be removed from the rear of the camera and inserted in the playback portion of the present system.

With reference to FIG. 11, a camera embodiment comprising a vidicon is illustrated in conjunction with a power pack and disc or drum storage unit 130. Here the image to be recorded is transmitted through the lens 132 and reflected to the shutter 134 by the optics of the camera. An eye piece 136 enables the user to view the image to be recorded. The vidicon tube 138 may conveniently be housed in the handle 140 of the camera. The vidicon 138 plugs into a socket 142 which in turn is connected to cable 144 by the service cap 146 and cable connector 148.

Replay System

Once a picture or series of pictures is recorded by the camera and associated recording means above described, provisions for reproducing the recorded signals on a visual display are required. A functional block diagram of a suitable replay system is shown in FIG. 12. The replay portion of the system is effective to detect the electronic signals stored as a result of the recording portion of the system.

Figure 14:
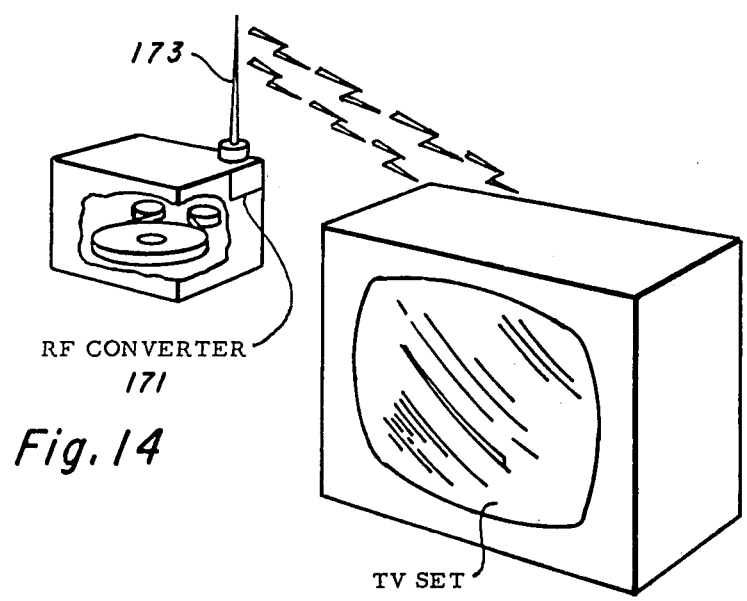

In FIG. 12 a detector is shown generally at 150. The function of the detector is to "detect" the electronic signals recorded by the electronic camera corresponding to one picture and repetitively apply these signals to a display 152 at a rate compatible with the display. If a conventional television set is utilized as the display, the required rate is 30 times per second. A drive mechanism 154 provides the required detection speed. A frame advance selects the desired picture record to be displayed. Block 158 is connected to the frame advance and display interface 160. Block 158, labeled "sound" magnetic tape can be provided to include a separate sound track for description of the various pictures to be displayed. Display interface 160 applies the signals to the display in the required format. The interface may comprise "hard-wired" connection as illustrated in FIGS. 13 and 16 or RF coupling as illustrated in FIG. 14. Suitable detector configurations are illustrated in FIGS. 15, and 17-20.

Figures 15A, 15B:
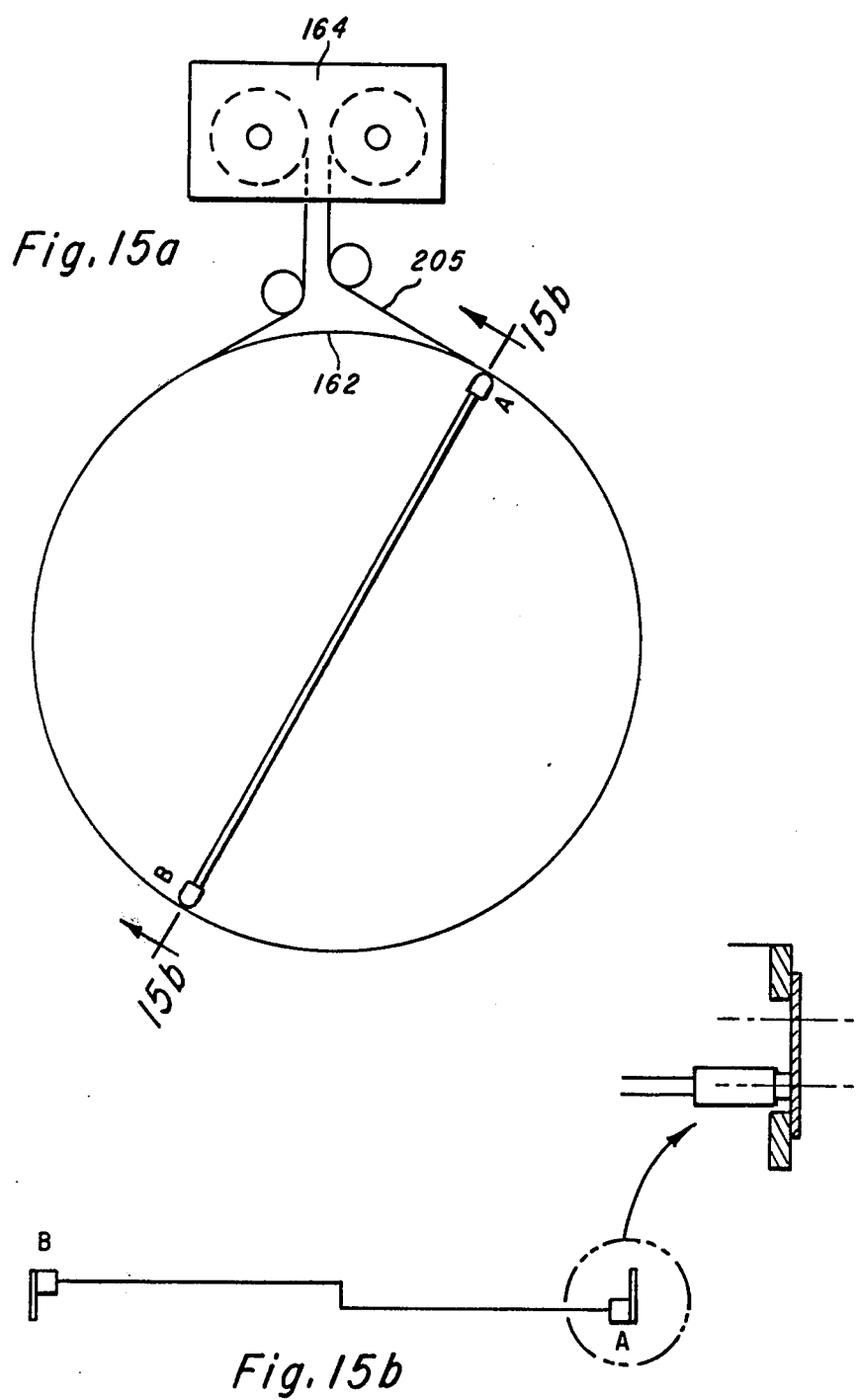

With reference to FIG. 15A, a suitable playback portion for magnetic tape media is diagrammatically illustrated. A magnetic tape 205 extends around a drum 162. The surface of the tape adjacent the drum 162 is magnetically coated. Magnetic heads A and B rotate about the interior of the drum. As can be seen in the cross-sectional view in FIG. 15B the tape heads contact different tracks on the tape 162, such as illustrated in the tape format of FIG. 3. The tape is suitably housed by a cassette 164. In this embodiment, the heads rotate at a speed of 1800 RPMs to provide the required 30 frames per second television format.

With reference to FIG. 13 an embodiment of the invention includes hardwiring the playback portion 169 to the television set. Such a configuration provides maximum efficiency. Suitable connection to a television set is illustrated in FIG. 16 at 163 and 165.

With reference to FIG. 14 an embodiment of the invention is depicted which maximizes user convenience. In this embodiment the detected signals are connected to an RF converter 171 and transmitted through an antenna 173 to the television receiver. All the used need to is turn his set on to an unused channel in order to display pictures. Suitable RF converters are described in the literature.

With respect to FIGS. 17-20, four illustrative detector configurations are shown which are suitable for playback of signals in a format compatible with television sets.

Figure 17:
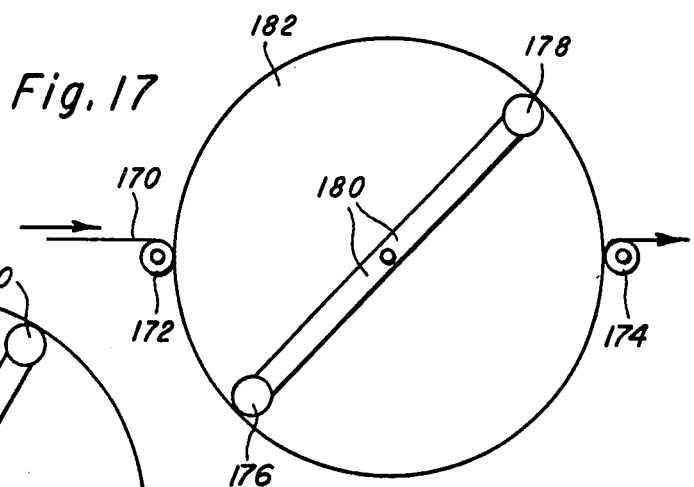

With reference now to FIG. 17 a playback technique is illustrated for utilization with the embodiment where the two interlaced fields making up one television frame are recorded on separate tracks. In FIG. 17 the portion of the magnetic tape 170 between idler pulleys 172 and 174 corresponds to the stored electronic record of one frame. Two magnetic heads 176 and 178 rotate about an axis 180 at a rate of 1800 RPMs. Magnetic head 176 detects one of the interlaced fields while head 178 detects the other. It can be seen that at this rate of rotation each magnetic head is adjacent the tape 170 only during one-half of each revolution, since the tape extends over only one-half of the drum 182. Accordingly, the head 176 completely traverses the tape between pulleys 172 and 174 in 1/60 of a second. The same is true for head 178, providing the required television frame having a total duration of 1/30 of a second. The magnetic heads continuously rotate at 1800 RPMs, thereby providing a stationary display on the television set of the recorded image. When it is desired to view the next picture recorded on the tape, the tape is physically advanced an amount corresponding to the length between pulleys 172 and 174.

Figure 18:
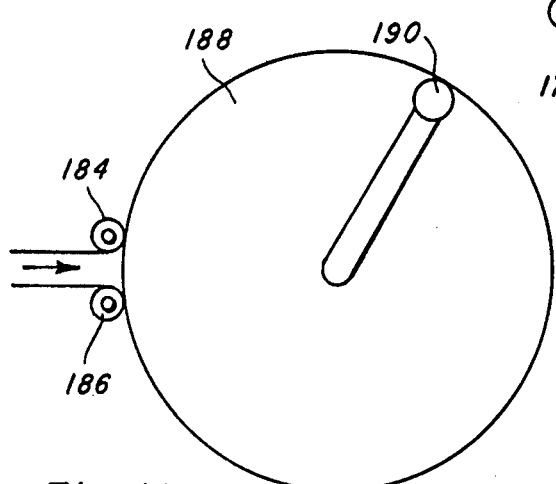

With reference to FIG. 18, the magnetic tape extends around idler pulleys 184 and 186 around the circumference of drum 188. Here the two interlaced fields corresponding to one television frame are sequentially defined on a single channel. Thus only one rotating magnetic head 190 is required. When the head 190 is rotated at 1800 RPMs, it effects a frame time of 1/30 of a second as required.

Figure 19:
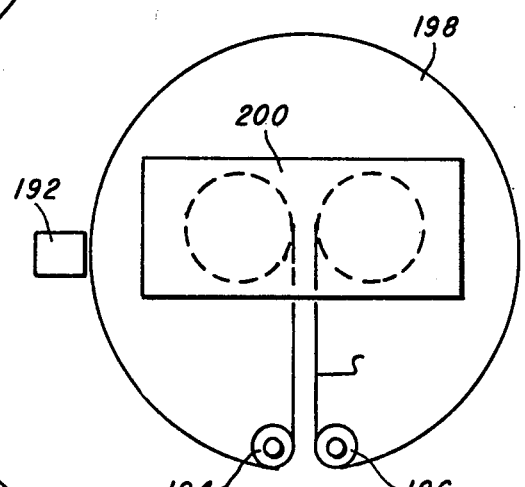

Referring to FIG. 19, an embodiment utilizing a stationary magnetic head is depicted. Similar to the arrangement of FIG. 18 the two interlaced fields are recorded in a single channel, and only one magnetic head 192 is required. The magnetic tape extends around idler pulleys 194 and 196 around the drum 198. In this embodiment the tape storage or cassette 200 is mounted inside the drum by suitable supports (not illustrated) and rotates therewith. A rotation speed of 1800 RPMs again provides the requisite television frame format.

Figure 20:
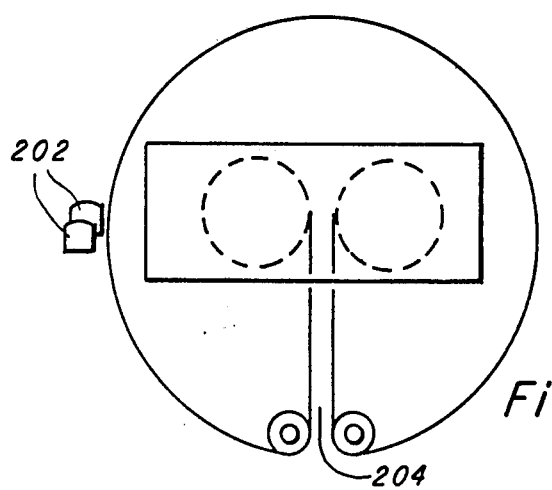

In FIG. 20 an arrangement similar to FIG. 19 is illustrated with the exception that the two interlaced fields are recorded on separate channels and two magnetic heads 202 are required. Here, to produce the requisite television format, the drum revolution speed is 3600 RPMs.

In the embodiments of FIGS. 18-20 wherein the tape extends around the drum except for the region immediately between the two idler pulleys, the gap 204 (FIG. 20) is synchronized to correspond to the vertical flyback time of the television set so that no noticeable disruption of the stationary picture occurs.

As described above an advantageous all electronic still picture recording and display system which utilizes a conventional television set for the display is provided. The system includes provision for recording electronic signals defining a frame or picture on inexpensive magnetic tape, discs and drums. The recorded signals are played back, i.e., detected, at a higher frequency compatible with television set frame format. The signal record is repetitively applied to the television set during each frame time, producing a stationary display. The display is characterized by numerous advantages heretofore unavailable in still picture photography. For example, the color of a displayed picture can be edited by using the television set color control. Additionally, provision for a spare magnetic tape as a part of the display enables editing the pictures recorded by the electronic camera. That is, those pictures of the total record which are desired to be retained may be recorded on the spare tape when actual display of the picture proves the merit of the view, pose, lighting, etc. Using magnetic tape each picture costs only about one-half cent, as compared to the much more expensive alternative of using photosensitive film and chemical processing techniques.

While the invention has been described in detail with respect to various illustrative embodiments, it will be appreciated that various modifications may be made without departing from the true scope or spirit of the invention.

What is claimed is:

1. An electronic still picture photography system comprising:
    (a) an electronic camera including:

(i) an optical electronic image transducer device having storage capability for storing data representing an optical image;
(ii) a scanning means for scanning said image transducer to read said data; and
(iii) a momentary actuation means;

(b) a recording apparatus for recording said data received from said electronic camera on a selected portion of a recording medium;

(c) means coupling said momentary actuation means to said recorder apparatus for controlling said recorder to record data representing a different single optical image on each such selected portion of said recording medium in response to each different actuation;

(d) a playback apparatus for reading, one at a time, selected ones of said single optical images from said recording medium, said playback apparatus including means for generating a video signal to play back said selected ones of said optical images on a television receiver-type display device.

2. An electronic still picture photography system according to claim 1, wherein said momentary actuation means includes an electrical switch device, and wherein said means coupling said momentary actuation means to said recording apparatus includes logic gate means responsive to said electrical switch device and to said scanning means for causing said recorder to record said data representing each different single optical image.

* * * * *